Figure 1:
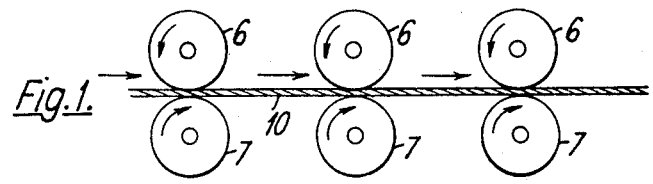

United States Patent [19]

Curry et al.

[11] 4,097,640
[45] Jun. 27, 1978

[54] PRODUCTION OF FIBROUS SHEET MATERIAL

[75] Inventors: Harold George Curry, Hambrook, near Bristol; Brian William Attwood, Hanham, near Bristol; Derek Graham Walter White, Bristol, all of England; John Mosgaard Christensen, Risskov; Karl Kristian Kobs Kroyer, Viby J, both of Denmark

[73] Assignee: Karl Kroyer St. Anne's Limited, Bristol, England

[21] Appl. No.: 751,038

[22] Filed: Dec. 16, 1976

Related U.S. Application Data

[60] Continuation of Ser. No. 534,240, Dec. 19, 1974, abandoned, which is a division of Ser. No. 375,094, Jun. 29, 1973, abandoned.

[30] Foreign Application Priority Data

Jul. 8, 1972 United Kingdom .............. 32098/72

[51] Int. Cl.² .................. B32B 29/00; B65D 5/00
[52] U.S. Cl. .................. 428/219; 229/3.5 R; 229/6 R; 264/112; 264/120; 264/128; 428/220; 428/35
[58] Field of Search ............... 428/220, 35, 219, 212; 229/3.5 R, 6 R; 264/128, 112, 120

[56] References Cited

U.S. PATENT DOCUMENTS

| | | | |
|---|---|---|---|
| 1,053,272 | 2/1913 | Brady | 229/3.5 R |
| 1,987,225 | 1/1935 | Bergstein | 229/3.5 R |
| 2,036,987 | 4/1936 | Watson | 229/6 R |
| 2,556,568 | 6/1951 | Aikman | 229/6 R |
| 3,311,285 | 3/1967 | Korr | 229/3.5 R |
| 3,511,430 | 5/1968 | Chuber | 229/6 R |
| 3,692,622 | 9/1972 | Dunning | 264/128 |
| 3,764,451 | 10/1973 | Dunning | 264/128 |
| 3,776,807 | 12/1973 | Dunning | 264/128 |

*Primary Examiner*—Ellis Robinson
*Attorney, Agent, or Firm*—Larson, Taylor and Hinds

[57] ABSTRACT

Foldable boxboard made by dry-laying cellulosic fibers and 1-10% starch. The boxboard has a weight of at least 210 g.s.m., a stiffness in the machine direction of at least 5.8 Kenley units, and a ratio of stiffness in the machine direction and in the cross-machine direction of substantially 1:1.

7 Claims, 9 Drawing Figures

PRODUCTION OF FIBROUS SHEET MATERIAL

This is a continuation of co-pending application Ser. No. 534,240, filed Dec. 19, 1974, and now abandoned, which was, in turn, a division of application Ser. No. 375,094, filed June 29, 1973, and now abandoned.

This invention concerns a process and apparatus for making fibrous material e.g. paper, paper board, folding boxboard and carton board. Although not so restricted it will hereinafter be described with reference to the manufacture of carton board grades of folding boxboard, and paper.

Conventionally made fibrous sheet materials when machine made suffer from the disadvantage that their dimensional stability is poor particularly in the cross machine direction, they are prone to curling and have physical characteristics e.g. stiffness and tensile strength which are markedly different in the cross-machine direction compared with the machine direction.

It has been found possible to avoid such undesirable characteristics by forming dry-laid fibrous webs. However a problem arises in the production of dry laid webs particularly in making paper and paperboard e.g. for cartons in that the development of strength is difficult to achieve without the use of excessive additives in the form of synthetic resins and binders or starch. Such additives are costly and, if added in excess can cause the product to be brittle, thus affecting the flexibility and folding qualities of the sheet. Similar detrimental affects can result by endeavouring to subject the web to excess heat. Excessive moisture, added to increase bonding properties is not attractive since the essence of the dry laid technique is of course to minimise the use of water. The use of excessive heat and/or pressure in hot pressing the web can cause serious adverse effects on the final sheet, particularly the surface characteristics resulting in difficulties in printing cutting and creasing the sheets.

It is possible to press a heated moistened web of dry laid fibres to consolidate the web into a sheet, but strength cannot be developed simply by repeating the simple pressing operation, as tests detailed below will demonstrate.

According to the present invention a process for the production of a sheet of fibrous material e.g. paper or paperboard comprises dry-laying a web of fibres, moistening the fibrous web and consolidating the web by repeatedly pressing the moistened fibrous web against a heated surface whilst it is maintained in continuous contact with the heated surface by a supporting band.

Preferably the process comprises passing the moistened fibrous web through at least two pressure nips spaced along the heated surface. The heated surface is preferably a smooth cylinder.

The process may comprise depositing the fibres onto a permeable band e.g. a wire or fabric, to form a web and using the permeable band as the supporting band during subsequent moistening and consolidation of the web.

In one embodiment the web is pressed at a pressure of at least 150 p.l.i. at a moisture content of less than 50% and a temperature of at least 150° F. Preferably the pressure is 200 – 250 p.l.i. the moisture content is of the order of 30% and the temperature 200° – 350° F.

The pressure rolls are normally unheated and cold.

It has been found possible to develop the strength of the web yet further by subsequently pressing the consolidated web by passing the unsupported web through a pressure nip including at least one plain roll.

Preferably the plain roll is applied against the surface of the consolidated web previously in contact with said supporting band.

Preferably the subsequent pressing is effected by passing the web through a nip defined by two plain rolls.

In a preferred embodiment the subsequent pressure nip is defined by a plain roll in co-operation with said heated surface used for consolidating the web.

Preferably the plain roll is heated.

The heated plain roll may be maintained at a temperature of 300° – 500° F and is applied with a pressure of 150 – 500 p.l.i.

The process may include adding a binder e.g. starch to the fibres. At least 1% and preferably 10% is added.

The invention also comprises apparatus for forming a sheet of paper or paperboard comprising a permeable band means for dry-laying a web of fibres on the band, means for moistening the fibrous web and means for consolidating the web comprising a heated surface, means for maintaining the moistened fibrous web against a heated surface, and means for pressing the web repeatedly against this surface whilst it is held in continuous contact with the surface.

Preferably the apparatus comprises at least two pressure rollers and means for urging them against said heated surface to define the pressure nips. The apparatus may comprise a heated cylinder, pressure rollers in co-operation therewith and means for wrapping the supporting band around said cylinder and through the pressure nips. It may include at least one plain pressure roll co-operating with the cylinder and defining a further pressure nip or nips and means for feeding the unsupported web therethrough. The plain roll is preferably heated.

Figure 6:
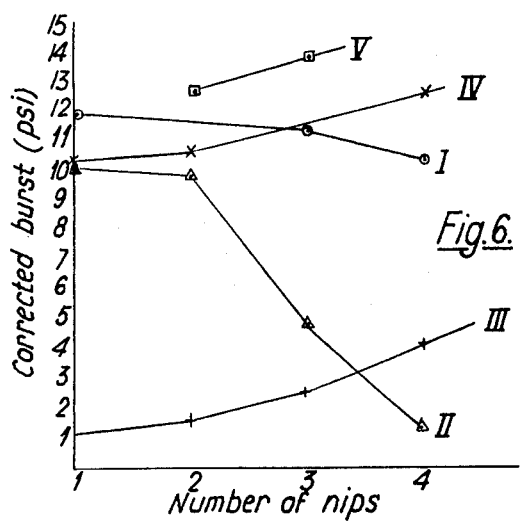

The invention is illustrated, merely by way of example, in the accompanying drawings in which:

FIGS. 1–5 are diagrammatic illustrations of five different forms of apparatus for developing strength characteristics in dry laid fibrous webs, FIG. 6 is a graph of the results obtained from experiments carried out with the apparatus of FIGS. 1–5, FIGS. 7, 8 and 9 are diagrammatic views of three alternative forms of machines for forming sheets of dry-laid fibrous materials according to the present invention.

In carrying out experiments to determine the best method of developing strength in a dry-laid fibrous web, webs were formed from a mixture of mechanical refiner ground wood pulp and 5% by weight Viscosol 220 (Registered Trade Mark) starch. This mixture way dry-laid onto a permeable band and sprayed with water to a 30% moisture content. With the band, the moistened web was passed through a number of different consolidating arrangements of heated pressure nips to determine the most effective. In each case a pressure nip was provided by running a rubber pressure roll 7, 20 against a smooth surface heated metal roll 6, 18 which had been steam-heated to a surface temperature of 220° F. A constant pressure of 200 p.l.i. (pounds per linear inch) was applied to each pressure nip.

For each experiment, an endeavour was made to form a web of 200 gsm dry basis weight. This was not always possible with the restraints of the experimental apparatus and a correction factor was employed to correct the results for an effective basis weight of 200gsm.

The measure of strength used for this series of experiments was 'burst' measured in p.s.i. (pounds per square inch) by the Tappi method.

FIGS. 1–5 illustrate the configurations of pressure nips used in the experiments. Each figure illustrates only one of a series of experiments using that basic configuration. In each case the experiment was repeated using a number of pressure nips.

Referring to FIG. 1, this series of experiments involved a heated roll 6 co-operating with a pressure roll 7 to provide each pressure nip. The dry-laid web 10, produced in the manner described above, was passed through each nip with the web unsupported i.e. no support band or wire was used. Three experiments were carried out, using one, three and four pressure nips in series. Only one experiment, using three pressure nips, is illustrated.

Figure 2:
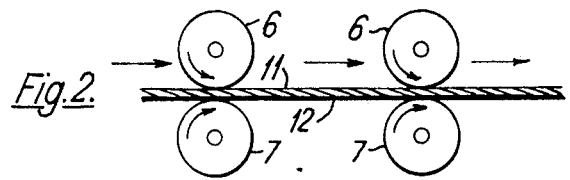

Referring to FIG. 2 the series of experiments was repeated using one two three and four nips, in this case the web 11 was supported on a permeable wire 12.

Figure 3:
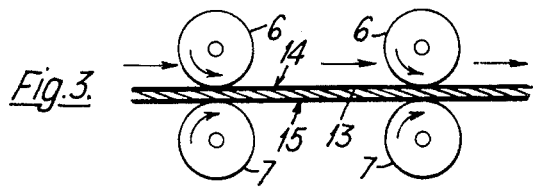

In the series of experiments illustrated in FIG. 3 the web 13 was supported between two permeable wires 14 and 15. The experiment was repeated with one, two, three, and four pressure nips.

Figures 4, 5:
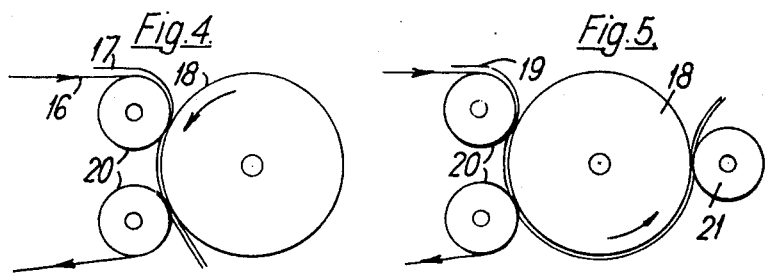

In FIG. 4 the series of experiments involved a large common heated roller or cylinder against which the pressure rollers were placed. The wire 16 effectively wrapped the heated roller 18 between the pressure rollers 20 whereby the web 17 was maintained in contact with the hot surface of the heated roller. The experiment was repeated with one two and four nips.

A further series of experiments was carried out using the configuration of FIG. 5. This was basically the same as FIG. 4 with the addition of a plain rubber pressing roll 21 which provided a pressure nip through which the unsupported web 19 passed after it had been pressed and initially consolidated by the previous pressure nips and whilst supported by wire 16. Thus the wire 16 did not pass completely around the heated roller 18 but only around part of the roller. In the example illustrated the wire was removed and returned to the forming section after the second pressing roll 20, the web continuing on the surface of the heated roll until it passed the pressing roll 21 after which it was removed from the apparatus.

The plain pressing roll 21 was applied at a pressure of 300 p.l.i. in this series of experiments, the previous pressure rolls 20 being applied at the standard 200 p.l.i. used throughout the experiments.

This series of experiments was effected using only two arrangements, the one illustrated and another in which only one pressure roll 20 was used, followed by a plain roll 21.

The webs produced in each series of experiments were subjected to the Tappi method to determine burst strength and the results obtained are shown in Table 1 and illustrated in FIG. 6.

Table 1

| Configuration | No. of nips | Basis Weight (gsm) | Caliper μm | Burst psi | Burst Corrected for BW 200 gsm |
|---|---|---|---|---|---|
| FIG. 1 | 1 | 196 | 550 | 11.7 | 12.0 |
|  | 3 | 183 | 370 | 10.5 | 11.5 |
|  | 4 | 177 | 322 | 9.3 | 10.5 |
| FIG. 2 | 1 | 202 | 560 | 10.2 | 10.1 |
|  | 2 | 200 | 545 | 10.0 | 10.0 |
|  | 3 | 185 | 560 | 4.5 | 4.9 |

Table 1-continued

| Configuration | No. of nips | Basis Weight (gsm) | Caliper μm | Burst psi | Burst Corrected for BW 200 gsm |
|---|---|---|---|---|---|
|  | 4 | 176 | 550 | 1.2 | 1.4 |
| FIG. 3 | 1 | 220 | 520 | 1.2 | 1.1 |
|  | 2 | 180 | 550 | 1.5 | 1.7 |
|  | 3 | 188 | 520 | 2.4 | 2.6 |
|  | 4 | 190 | 520 | 4.0 | 4.2 |
| FIG. 4 | 1 | 200 | 545 | 10.4 | 10.4 |
|  | 2 | 202 | 550 | 10.8 | 10.7 |
|  | 4 | 188 | 385 | 12.0 | 12.8 |
| FIG. 5 | 1+1 | 219 | 475 | 14.0 | 12.8 |
|  | 2+1 | 206 | 495 | 14.4 | 14.0 |

Considering the results, it will be seen that no great strength was developed in the FIG. 3 configuration. It is felt that this was primarily due to the heat loss created by the presence of the two wires, thereby preventing sufficient heat reaching the fibrous web. Configuration of FIGS. 1 and 2 started reasonably well with a single nip, but in both cases the strength could not be developed by increasing the number of nips. Indeed strength fell in both cases. In the FIG. 2 embodiment the poor results are thought to result from heat losses between pressings and the sequence of pressing and relaxing the pressure causing weakening of the fibre bonds. In the case of FIG. 1 arrangement, the problem is one of more practical nature rather than the lack of strength. The pulp was found to stick to the rollers and of course was extremely difficult to handle before and between pressure nips. The configuration is not practical. Also the web lost strength for the reasons explained with reference to FIG. 2.

The results obtained from FIGS. 4 and 5 apparatus were most encouraging. Both indicated that strength could be developed by this technique. It is thought that this is due to the continued intimate contact of web with heated surface preventing cooling and maintaining some pressure even between nips. Thus the pressing accompanied by heat is continuous and results in a development of strength.

The experiments described above have been effected using standard moisture and binder content, pressures, temperatures and speed. It is known that even the strengths obtained can be further improved by altering these variables.

A further series of experiments was conducted using the configuration of FIG. 5. In view of the encouraging results obtained with a plain unheated roll 21 in developing strength in the previously consolidated sheet, it was arranged to replace the roll 21 with a heated plain roll. A consolidated web laid from New Bern Hardwood bleached kraft was used with 5% viscosol 220. A target weight of 200 gsm was used and the results of the actual webs (170 – 180 gsm) were corrected to this target. The cylinder 18 was run at a temperature of 284° F and the plain heated roll 21 was run at various temperatures and at varying pressures. The stiffness and the burst factor (corrected) were determined for each web produced. The series of runs and results are listed in Table 2.

Table 2

| Run No. | Temperature of plain roll °F | Nip pressure p.l.i. | Stiffness Kenley Units | Burst Factor |
|---|---|---|---|---|
| 1 | 0 | 0 | 1.7 | 8.6 |
| 2 | 320 | 100 | 3.0 | 9.0 |
| 3 | 320 | 200 | 6.8 | 10.5 |
| 4 | 320 | 230 | 6.8 | 10.8 |
| 5 | 320 | 300 | — | 11.2 |

Table 2-continued

| Run No. | Temperature of plain roll °F | Nip pressure p.l.i. | Stiffness Kenley Units | Burst Factor |
|---|---|---|---|---|
| 6 | 400 | 200 | 7.4 | 11.4 |
| 7 | 400 | 300 | 8.0 | 11.8 |
| 8 | 400 | 400 | 9.0 | 12.5 |

Referring to Table 2 it will be seen that compared with no plain roller at all (run 1) the stiffness and strength (burst factor) increased with both temperature and pressure. Burst increased between runs 1 and 8 by 50% and stiffness by a factor of more than 5.

An additional advantage of the plain roll, particularly when heated, is the pressing effect on the surface of the web, which reduces the wire mark and improves the surface characteristics.

Rather than use a plain heated roll in contact with heated cylinder 18, a heated nip could be provided by two other pressure rolls i.e. not co-operating with roll 18. A callendar stack may be used for example. On the other hand a number of heated rollers may be spaced about cylinder 18 or about another such cylinder to which the previously consolidated web is fed.

With the need to develop very high strengths, it may be necessary to modify the moisture content of the consolidated web. This can be done by spraying or preferably with a wet felt between consolidating and the further hot pressing with plain rolls.

Figure 7:
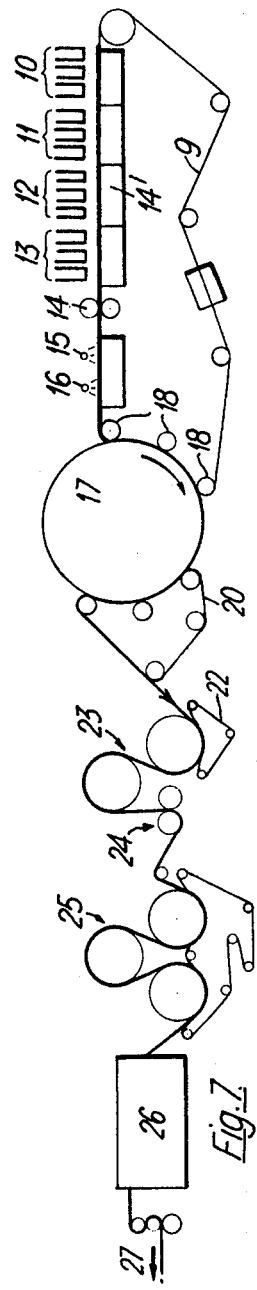
Figure 8:
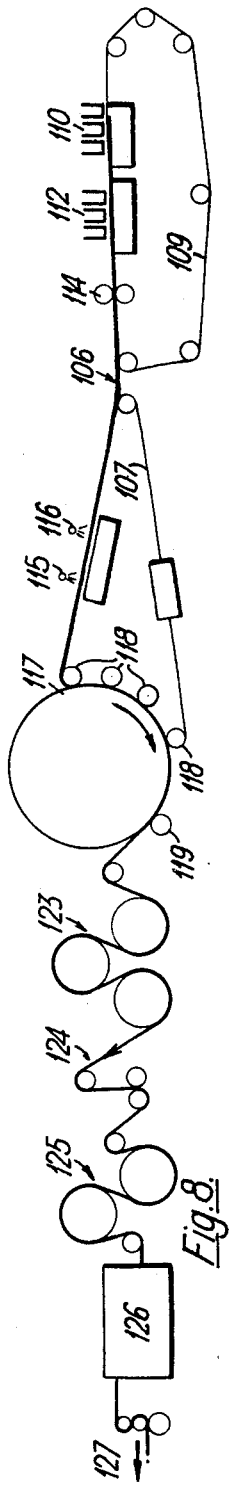
Figure 9:
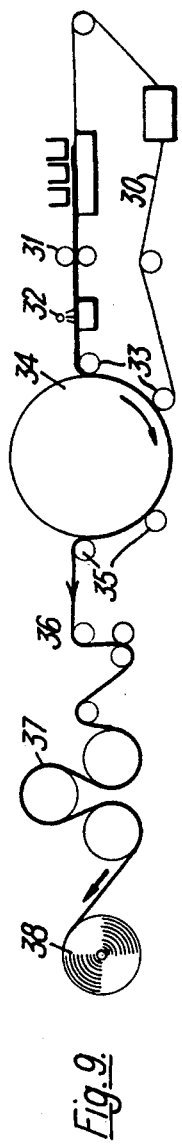

Practical application of the results of this work is illustrated in FIGS. 7, 8 and 9 which show three configurations of paper and paper board machine employing the embodiments of FIGS. 4 or 5.

FIG. 7 of the drawing which shows a machine for making sheets from dry laid fibres. The machine comprises an endless wire 9 (of plastic or felt) on which are laid dry fibres mixed with a dry binder such as powdered starch. Different mixtures are deposited in an air stream from distributor heads 10, 11, 12 and 13. For example, from heads 11 and 12 is deposited a 150 gsm layer of refiner groundwood pulp mixed with 10% dry Viscosol (Registered Trade Mark), a powdered starch. From heads 10 and 13 are deposited webs of 20gsm and 40gsm respectively of a chemical white pulp fibre such as Stora fluffing pulp from Stora KoppOrberg mixed with 4% by weight dry Viscosol.

Vacuum boxes 14 hold the mixtures on the wire 9.

The resulting dry-laid multi-ply web is passed through compacting rollers 14 at 10 p.l.i. nip pressure and under wetting sprays 15, 16 where it is sprayed with water to provide a moisture content of 30%. The moist web passes around the surface of a steam heated cylinder 17 being pressed into contact therewith over one quarter of its periphery by press rolls 18. The cylinder is 12 feet in diameter, surface temperature 230° F. Each nip pressure 250 p.l.i. At the lowest point on the cylinder sheet is compacted and the moisture content has been reduced to within the range 15 to 20%. The web or base sheet so formed is contacted by a transfer fabric 20 which continues the pressing action, with cold (unheated) rolls the base sheet leaving the cylinder with a moisture content of approximately 15%. The sheet is transferred to a dryer fabric 22 which passes the web through a stack of drying cylinders 23 to reduce the moisture content to approximately 10%. The dried, formed base sheet passes on to vertical size press 24 and further drying cylinders 25 and other treatment units at 26 before passing as finished board to the finishing and reel-up units 27.

Referring now to FIG. 8 there is shown an alternative form of machine which differs from that of FIG. 7 in a few small details. The main difference is that two wires are used for laying, compacting and hot moist pressing the web. One wire, 109 carries the dry laid fibres mixed with Viscosol from heads 110 and 112 through compacting rollers 114. The web 106 is then passed onto a second wire 107 which carries it under spray heads 115, 116 and around heated cylinder 117 past press rolls 118. A heated plain roll 119 could be added.

With the apparatus of FIG. 8, 100gsm is laid by each head, head 110 laying refiner ground wood with 4% Viscosol and head 112 laying chemical wood pulp with 4% Viscosol. The compacting rollers 114 apply a nip pressure of 10 p.l.i.

The parameters of the machine are the same as those of the FIG. 7 embodiment. However no transfer fabric is employed on the cylinder 117. The web passes directly to the stations 123-127 which correspond to 23-27 of FIG. 7.

Although as described above a cylinder 12 feet in diameter and having a surface temperature of 230° F was employed, experience does indicate that a smaller cylinder, say 6 feet diameter using a surface temperature of say 350° F could be preferable for certain applications. Also increasing the pressure of the rolls, modifying the moisture content and/or binder content can also vary the characteristics appreciably.

Thus FIG. 9 shows an arrangement which could be used for producing paper webs. Fibres are deposited on to a porous screen such as a plastic wire or porous felt 30. The web passes through press rolls 31 operating at 10 p.l.i. and is sprayed by a spray head 32. Two press rollers 33 press the web at 250 p.l.i. against a 6 feet diameter steam heated cylinder 34 having a surface temperature of 300° F. Further pressing takes place by plain rolls 35 heated to 400° F which press against the web directly at 400 p.l.i. and urge it into contact with cylinder 34 without an intervening wire. Finally, further treatment as may be required is carried out by application at a size press 36 and drying stack 37 before the sheet is reeled up at 38.

Physical properties of the base sheet (i.e. before finishing and coating) formed on the machines of FIGS. 7 and 8 (without roll 119) are compared with a conventionally made wet laid board in Table 3. Also included in Table 3 are the characteristics of the same dry laid sheet after finishing and coating.

Conventional British Standard methods were employed for measuring tensile (using a Schopper tensile tester), and stretch under stress and stiffness was measured using a Kenley tester.

Table 3

| Property | A | B (i) | B (ii) | C (i) | C (ii) |
|---|---|---|---|---|---|
| Basis Weight (gsm) | 259 | 240 | 290 | 210 | 250 |
| Caliper (microns) | 442 | 480 | 450 | 420 | 460 |
| Bulk Ratio (asg) | 0.59 | 0.50 | 0.64 | 0.50 | 0.54 |
| Dimensional Stability (%) | | | | | |
| M/c Direction | 0.05 | 0.05 | 0.05 | 0.05 | 0.05 |
| Cross M/c Direction | 0.50 | 0.05 | 0.05 | 0.05 | 0.05 |
| Ratio Cross M/c to M/c | 10:1 | 1:1 | 1:1 | 1:1 | 1:1 |
| Tensile (kgm/1.5cm Width) | | | | | |
| (Schopper Tensile Tester) | | | | | |
| M/c Direction | 25.5 | 7.7 | 7.9 | 6.9 | 7.3 |
| Cross M/c Direction | 7.9 | 7.7 | 7.9 | 7.1 | 7.4 |
| Ratio M/c to Cross M/c | 3.2:1 | 1:1 | 1:1 | 1:1 | 1:1 |
| Stretch (%) Under Stress | | | | | |

Table 3-continued

| Property | A | B (i) | B (ii) | C (i) | C (ii) |
|---|---|---|---|---|---|
| M/c Direction | 3.1 | 2.7 | 2.7 | 2.5 | 2.5 |
| Cross M/c Direction | 4.4 | 2.7 | 2.7 | 2.5 | 2.5 |
| Ratio Cross M/c to M/c | 1.4:1 | 1:1 | 1:1 | 1:1 | 1:1 |
| Stiffness (Kenley Units) | | | | | |
| M/c Direction | 35.0 | 7.6 | 15.8 | 5.8 | 14 |
| Cross M/c Direction | 10.7 | 7.4 | 15.6 | 5.7 | 14 |
| Ratio M/c to Cross M/c | 3.3:1 | 1:1 | 1:1 | 1:1 | 1:1 |

Code
A Conventional wet laid white lined Duplex type board.
B Dry laid white lined Duplex type board
 (i) before finishing and coating.
 (ii) after finishing and coating.
C Dry laid white lined Triplex type board
 (i) before finishing and coating.
 (ii) after finishing and coating.

Further treatment is shown in FIGS. 7 and 8 such as application at the size press and at the coating head of suitable sizing and surfacing. With these further treatments, the base sheet characteristics can be altered. Thus strength characteristics such as stiffness can be greatly enhanced to bring it to the requirement of the converting process without adversely affecting the other properties or the squareness of the product.

It will be seen that the sheet so formed is virtually 'square' in that the ratio of its physical properties in the cross-machine direction and the machine direction is substantially 1:1. The same ratio is applicable to the physical characteristics of the base sheet taken in any two mutually perpendicular directions in the plane of the sheet thus providing an "homogeneous" sheet.

One of the most beneficial characteristics of the new product, is the dimensional stability of the sheet to changes in atmospheric humidity. It will be seen that the sheet is virtually completely stable, having a percentage change of only 0.05 in both machine and cross machine directions. Similar values are expected in all directions in the plane of the sheet.

Such a stable sheet has great benefits for the converter. The printer will have less problem with register and, particularly on multi-colour printing, this will greatly increase efficiency as well as drastically reducing scrap. The carton cutter creaser and maker will also benefit since the stable sheet will provide stable size cartons having stable dimensions and this will greatly increase the efficiency of the carton making as well as the packaging machinery. Rotary printing cutting and creasing are particular areas benefiting from the stable sheet.

The squareness and homogeneity of the resulting sheet also has benefits for the converter i.e. the printer and carton board manufacture. It is known that in conventional board better creasing can be effected in the cross machine direction compared with the machine direction. With the present sheet there will be less difference and indeed the difference can be eliminated. Thus the carton maker will not be limited on the manner in which he must set out or lay down carton blanks on a sheet. Whereas carton blanks have conventionally been laid down transversely of a web of material i.e. with their longitudinal axis across the sheet, one can lay them down along the sheet with the present material. This gives the carton maker more flexibility particularly in accommodating more carton blanks across the web width. Large savings can result.

Furthermore by tending to equalise the properties of dimensional stability and shrinkage in the two directions, the problems of register and printing generally on rotary gravure machines will be decreased. Again, rotary cutting and creasing can be facilitated since more controllable sheets will be provided.

The present board has as good cutting and creasing properties in all directions as conventional board has in the cross machine direction. Furthermore it is found that the board is relatively easily mouldable. The board can be forced past its elastic limit more readily than in conventional boards. This facility not only avoids spring-back of normal folded creases but also enables one to mould the board to many different shapes. The creases will also be sharper and will provide the resulting carton with a squarer and more attractive appearance.

The bulk factor of the present can be made far better than conventional board. This can provide greatly enhanced printing qualities particularly for gravure printing. Thus the bulkier board will be more compressible and will thus more readily withdraw the ink from printing rollers. Bulk will also provide greater protection for goods packed in cartons made from the board or, for the same caliper board, a lighter board can be used compared with conventional standards. Bulkiness also facilitates creasing and folding since the board is more compressible. Thus whereas conventional boards resists folding due to their low compressibility at the internal surface on corner creasing, present boards will readily compress and thus fold more readily. As well as giving sharper creases this provides less spring-back and more efficient folds.

Thus with the present invention there is provided a process and apparatus for consolidating and developing strength in dry-laid webs of fibrous material without the need for excessive moisture binder heat or pressure and in a practical and efficient manner which does not detract from the benefits of the dry-laying technique for web production. The process and apparatus is particularly well suited to the production of paper paperboards and folding boxboards.

What we claim is:

1. Foldable boxboard made by a dry-laying process, consisting essentially of cellulosic fibers and from 1 to 10% by weight of starch and having the following characteristics:
 (a) a weight of at least 210 g.s.m.;
 (b) a stiffness in the machine direction of at least 5.8 Kenley units; and
 (c) a ratio of stiffness in the machine direction and in the cross-machine direction of substantially 1:1.

2. Foldable boxboard according to claim 1, wherein its caliper is at least about 420 microns.

3. Foldable boxboard according to claim 1, wherein its caliper is between about 420 and about 480 microns.

4. Foldable boxboard according to claim 1, wherein the stiffness in the machine direction is between about 5.8 and about 15.8 Kenley units.

5. Foldable boxboard according to claim 1, wherein the bulk ratio is at least about 0.50 a.s.g.

6. Foldable boxboard according to claim 1, wherein the bulk ratio is between about 0.50 and about 0.64 a.s.g.

7. Foldable boxboard according to claim 1, the boxboard being Duplex type board which has been finished and coated, wherein
 (a) its weight is about 290 g.s.m.
 (b) and its stiffness in the machine direction is about 15.8 Kenley units.

* * * * *